Feb. 25, 1969    H. N. SHOJI    3,430,179
CABLE REEL

Filed July 21, 1966    Sheet 1 of 2

INVENTOR.
HENRY NORIHIKO SHOJI
BY Maybee & Legris
ATTORNEYS

Feb. 25, 1969     H. N. SHOJI     3,430,179
CABLE REEL

Filed July 21, 1966     Sheet 2 of 2

*INVENTOR.*
HENRY NORIHIKO SHOJI
BY *Maybee & Legris*
ATTORNEYS

United States Patent Office 3,430,179
Patented Feb. 25, 1969

3,430,179
CABLE REEL
Henry Norihiko Shoji, Rexdale, Ontario, Canada, assignor to Orenda Limited, Toronto, Ontario, Canada, a Canadian company
Filed July 21, 1966, Ser. No. 567,006
U.S. Cl. 339—5                                  4 Claims
Int. Cl. H01r *39/12*

ABSTRACT OF THE DISCLOSURE

An electrical connector for connecting a multiconductor cable on a reel with an exterior multiconductor cable comprises a rotatable inner sleeve and a stationary outer sleeve, and a one-piece, flat flexible multiconductor element wound around the inner sleeve. The inner end of the multiconductor element terminates at a multiple terminal electrical connector secured to the inner sleeve, and the outer end of the cable terminates at a multiple terminal electrical connector secured to the outer sleeve. The inner sleeve is rotatable with the reel, and the multiconductor element unwinds from the inner sleeve as the reel revolves and the multiconductor cable on the reel is payed out.

---

This invention relates to an electrical connector for electricity connecting a multiconductor cable on a reel with another multiconductor cable.

Slip rings and brushes are commonly used to electrically connect two relatively rotating conductors, particularly when the relative rotation continues indefinitely. Flexible connections such as "pig-tails" are sometimes used when the relative rotation is less than one revolution. A third kind of relative rotation, with which this invention is concerned, involves a limited number of revolutions. An example of this is a reel for winding and unwinding a multiconductor cable which can be used, for example, to electrically connect a towed, submerged, sonar device to electrical equipment in a boat. Slip rings and brushes are commonly used with this kind of apparatus.

In the present invention the joint between the reel cable and a cable leading to the reel comprises one multi-contact connector mounted on the reel shaft and another multi-contact connector on the shaft support, with the cables being electrically connected to these connectors; and a flat multi-lead cable wound around the shaft and connected at each end to the connectors. An annular spacing btween parts of the shaft and the support permits the flat cable to wind or unwind as the reel is rotated, thus providing continuous current between the cables.

An object of this invention is to provide a simple, compact and reliable electrical connector for use with a reel or the like that is intended to make a limited number of revolutions, without using slip rings or brushes.

A preferred embodiment of the invention is illustrated by way of example in the accompanying drawings in which.

Figure 1:
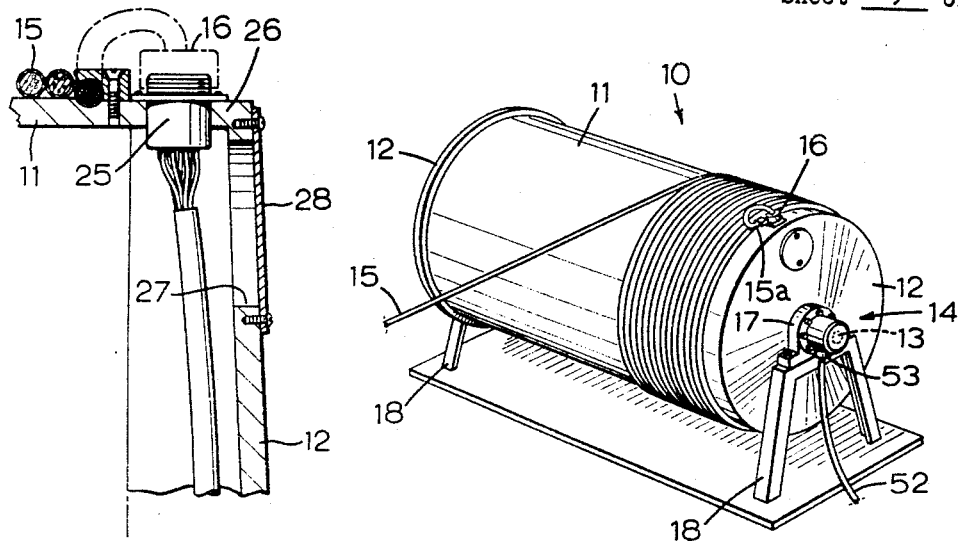
FIG. 1 is a perspective view of a reel having a multiconductor cable wound around it.

In FIG. 1 a typical reel with which the invention may be used is generally indicated at 10, and it may, for example, form part of apparatus used for towing a submerged sonar device from a boat, or a magnetometer or other like device from an aircraft. Many other applications will readily come to mind. The reel 10 includes a circular drum 11 having end walls 12, and an axle 13 that is journalled for rotation at 14. Wound around the drum 11 is a multiconductor cable 15 which conveys electrical signals to and from a towed device (not shown). An end 15a of the cable 15 is suitably clamped to the drum and terminates in a conventional multi-pin electrical connector plug 16. Two pillow blocks 17, which are themselves bolted to pedestals 18, rotatably support the axle 13 at the journal points 14.

Figure 2:
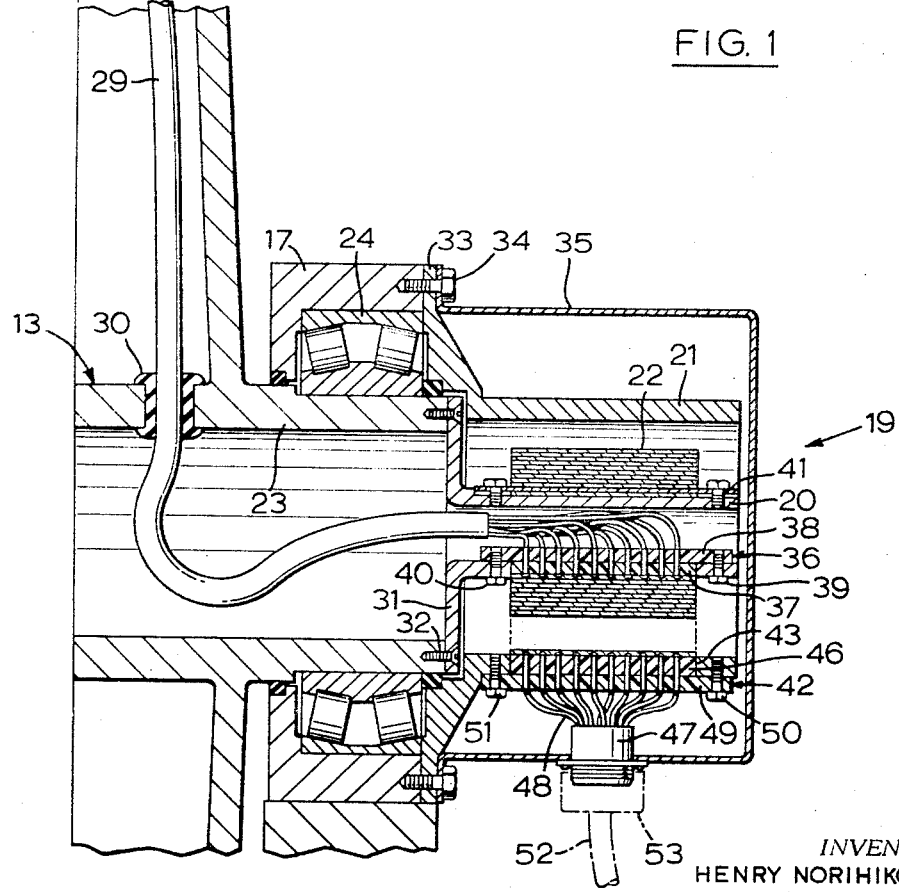
FIG. 2 is an enlarged sectional view taken through the centre of the reel of FIG. 1, and showing the principal elements of an electrical connector.
Figure 3:
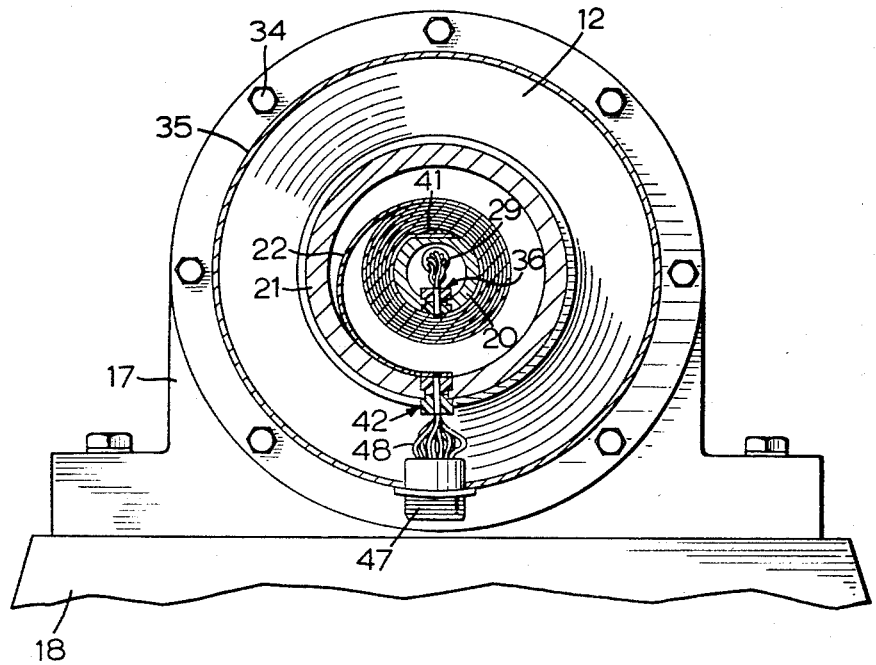
FIG. 3 is a sectional view taken along the line 3—3 in FIG. 2.

An electrical connector according to the invention is generally indicated by reference numeral 19 in FIG. 2, and its principal elements include a cylindrical inner sleeve 20 that is rotatable with the reel 10, a stationary cylindrical outer sleeve 21 which surrounds the inner sleeve and is spaced therefrom, and a one-piece, flat, flexible multiconductor element 22 that is wound around the inner sleeve. The inner end of the multiconductor element 22 is secured to the inner sleeve 20 and the outer end of the multiconductor element 22 is secured to the outer sleeve 21. As will be seen, as the multiconductor cable 15 is paid out from the reel 10, the multiconductor element 22 unwinds from the inner sleeve 20 and lays up in successive coils against the inner surface of the outer sleeve 21. The operation is reversed when the cable 15 is re-wound.

Having generally described a typical reel and the electrical connector of the invention, a more detailed description of each follows.

An end wall 12 of the drum 11 is formed with a coaxial hollow journal 23, carrying thereon a self-aligning roller bearing 24. The outer race of the roller bearing is supported by the pillow block 17. An electrical connector socket 25 to receive the plug 16 is mounted in a peripheral flange 26 of the end wall 12. In order to facilitate fitting and maintenance of the connector socket 25, a hand hole 27, having a cover 28, is provided at the end of the drum adjacent the socket. A multi-wire connecting cable 29 extends from the socket 25 radially inwards to the interior of the journal 23, the cable passing through a bushing 30 in the wall of an axial inward extension of the journal.

The cylindrical inner sleeve 20 is attached to the free end of journal 23 by an integral radial flange 31 and a series of bolts 32, the inner sleeve thus being rotatable with the journal. The stationary outer sleeve 21, which is coaxial with and spaced from the sleeve 20, is attached by an integral radial flange 33 and bolts 34 to the pillow block 17, the flange 33 acting as a retainer for the outer race of bearing 24. The bolts 34 also retain a cylindrical sheet metal end cover 35 which protects the sleeves and their associated components.

A miniature strip connector 36 having a plurality of terminals is mounted in a longitudinal slot in the inner sleeve 20. The connector 36 is of the type comprising a plug portion 37 with radially inwardly extending contact pins and a socket portion 38 which snaps into place over the pins of the plug portion, the latter being keyed into the slot by splines (not shown). The two halves of the connector 36 are locked together by bolts 39 and 40, the bolt 39 passing through the sleeve 20 and serving to retain the connector in its slot. The individual conductors of cable 29 are attached (as by soldering) to individual socket terminals of the socket portion 38.

The individual pins of plug portion 37 are connected to the individual conductors in the flexible multi-conductor element 22. The conductor element 22 is wound upon the sleeve 20 with the same number of turns and in the same direction of rotation as the conductor cable 15 on the reel 10. At the first half turn a removable chordal segment 41 of the sleeve 20 is arranged to clamp the element 22 firmly to the sleeve and relieve any tensional strain on the portion connected to the strip connector 36. The free ends of the conductors in the multi-conductor element 22 are connected (again as by soldering) to individual terminal pins of a strip connector 42 which is retained in a slot 43 in the outer sleeve 21 in precisely the same manner as the connector 36 is retained in its slot. The pins of a plug portion 46 of the connector 42, however, extend radially outwardly of the sleeve.

An electrical connector socket 47 is mounted in the wall of end cover 35, and leads 48 from its terminals are connected to the terminals of a socket strip 49 which constitutes part of the connector 42 and which is retained by bolts 50 and 51. The leads 48 are of sufficient length to enable the cover to be removed without disturbing the sleeves 20 and 21. An exterior multi-conductor cable 52 (FIG. 1) is connected to the socket 47 through a connector plug 53.

In operation, as the reel 10 revolves for paying out its towing cable 15, the inner sleeve 20 revolves with the journal 23 to which it is attached. As the sleeve 20 revolves, the flexible multi-conductor element 22, which has a degree of self-supporting rigidity, unwinds therefrom and lays up in successive coils on the inner surface of the outer sleeve 20. This continues until any given length of towing cable up to its full length is paid out. When the cable 15 is winched in again the reverse action takes place, the multi-conductor element coiling once more onto the inner sleeve 20.

What I claim as my invention is:

1. In combination, a reel for multiconductor cable, the reel having a central axle that is journalled for rotation, and connecting means for electrically connecting a multiconductor cable on the reel with an exterior multiconductor cable, said connecting means comprising:
   a cylindrical inner sleeve that is secured to and is coaxial and rotatable with the axle of the reel,
   a cylindrical stationary outer sleeve which surrounds the inner sleeve and is spaced therefrom,
   a one-piece, flat flexible multiconductor element that is wound around the inner sleeve,
   a first multiple terminal electrical connector secured to the inner sleeve, and a second multiple terminal electrical connector secured to the outer sleeve, the inner end of the multiconductor element terminating at the first multiple terminal electrical connector and the outer end of the multiconductor element terminating at the second multiple terminal electrical connector, whereby the multiconductor element unwinds from the inner sleeve as the reel revolves and the multiconductor cable on the reel is payed out, and vice versa.

2. The combination claimed in claim 1, wherein the inner sleeve and outer sleeve are each formed with an axially extending longitudinal slot, and each multiple terminal electrical connector comprises a plug portion which is keyed into the respective slot and has a plurality of radially extending contact pins and a socket portion which snaps into place over the contact pins of the associated plug portion.

3. The combination claimed in claim 1, wherein the ends of the reel are formed with integral axially extending hollow journals each carrying a self-aligning roller bearing with inner and outer races, the journals being secured to the inner races and the outer races being supported by pillow blocks.

4. The combination claimed in claim 3, wherein said inner and outer sleeves are formed with integral radial flanges which are respectively bolted to the ends of the journal and the pillow block at one end of the reel.

References Cited

UNITED STATES PATENTS

| | | | |
|---|---|---|---|
| 1,446,410 | 2/1923 | Bennett et al. | 242—107.1 |
| 2,270,997 | 1/1942 | Davis | 191—12.4 |
| 3,061,234 | 10/1962 | Morey | 191—12.2 X |
| 3,208,025 | 9/1965 | Hansen | 339—5 |
| 3,300,572 | 1/1967 | Dahlgren et al. | 191—12 X |

RICHARD E. MOORE, *Primary Examiner.*